(12) United States Patent
Wilfried et al.

(10) Patent No.: US 11,861,871 B2
(45) Date of Patent: Jan. 2, 2024

(54) CRACK EVALUATION OF ROOFING MEMBRANE BY ARTIFICIAL NEURAL NETWORKS

(71) Applicant: SIKA TECHNOLOGY AG, Baar (CH)

(72) Inventors: Carl Wilfried, Wädenswil (CH); Katrin Schumann, Kriens (CH); Roger Kathriner, Kriens (CH); Karin Odermatt, Sarnen (CH)

(73) Assignee: SIKA TECHNOLOGY AG, Baar (CH)

( * ) Notice: Subject to any disclaimer, the term of this patent is extended or adjusted under 35 U.S.C. 154(b) by 780 days.

(21) Appl. No.: 16/980,647

(22) PCT Filed: Mar. 28, 2019

(86) PCT No.: PCT/EP2019/057831
§ 371 (c)(1),
(2) Date: Sep. 14, 2020

(87) PCT Pub. No.: WO2019/185774
PCT Pub. Date: Oct. 3, 2019

(65) Prior Publication Data
US 2021/0012159 A1    Jan. 14, 2021

(30) Foreign Application Priority Data
Mar. 28, 2018   (EP) ..................... 18164450

(51) Int. Cl.
*G06K 9/62*       (2022.01)
*G06V 10/764*     (2022.01)
(Continued)

(52) U.S. Cl.
CPC .......... *G06V 10/764* (2022.01); *G06F 18/214* (2023.01); *G06F 18/2415* (2023.01); *G06N 3/08* (2013.01); *G06V 10/82* (2022.01)

(58) Field of Classification Search
None
See application file for complete search history.

(56) References Cited

U.S. PATENT DOCUMENTS 5,122,126 A *   6/1992 Sakakiyama ......... A61J 1/1406
                                              215/247
9,214,353 B2 * 12/2015 Yonehara .............. B23K 26/53
(Continued)

FOREIGN PATENT DOCUMENTS

CN     103733234 A    4/2014
JP     H06-27046 A    2/1994
(Continued)

OTHER PUBLICATIONS

Attoh-Okine et al.; "Comparative analysis of artificial neural networks and evolutionary programming in roof deterioration modeling;" Construction and Building Materials; 1999; pp. 311-320; vol. 13.

(Continued)

*Primary Examiner* — Maikhanh Nguyen
(74) *Attorney, Agent, or Firm* — Oliff PLC

(57) ABSTRACT

A method and system for evaluating crack intensity on polymeric sheet based on predetermined scale of crack intensity grades, which includes the steps of a) recording digital image of at least portion of surface of polymeric sheet using apparatus for recording digital images; and b) automatic classification of crack intensity by computer-implemented program for pattern recognition by means of trained artificial neural network, including 1) inputting digital image or one or more subareas of digital image to trained artificial neural network as input data, 2) classification by artificial neural network by assigning grade from predetermined scale of crack intensity grades to digital image or one or more subareas and 3) outputting assigned grade or grades for digital image and/or one or more subareas as output data, (Continued)

wherein artificial neural network is trained in advance in learning phase with plurality of digital images or subareas thereof of polymeric sheet surface portions.

16 Claims, 4 Drawing Sheets

(51) Int. Cl.
    *G06N 3/08*     (2023.01)
    *G06F 18/214*     (2023.01)
    *G06F 18/2415*     (2023.01)
    *G06V 10/82*     (2022.01)

(56) References Cited

U.S. PATENT DOCUMENTS

| | | | |
|---|---|---|---|
| 9,915,069 B1* | 3/2018 | Wang | B32B 25/02 |
| 9,987,786 B2* | 6/2018 | Stoiljkovic | B29C 48/41 |
| 2009/0288359 A1* | 11/2009 | Martin, Jr. | E04F 15/02172 |
| | | | 428/297.4 |

FOREIGN PATENT DOCUMENTS

| | | |
|---|---|---|
| JP | 2001-296236 A | 10/2001 |
| JP | 2004-12422 A | 1/2004 |
| JP | 2012-97453 A | 5/2012 |
| JP | 2016-142601 A | 8/2016 |

OTHER PUBLICATIONS

Berdahl et al.; "Weathering of roofing materials—An overview;" Construction and Building Materials; 2008; pp. 423-433; vol. 22.

Ramos et al.; "Methodology for the service life prediction of ceramic claddings in pitched roofs;" Construction and Building Materials; 2018; pp. 286-299; vol. 166.

Mackin et al.; "Fatigue Testing of Polymer Membranes;" Polymer Composites; 2004; pp. 442-450; vol. 25, No. 4.

Wang; "Artificial Neural Network;" Interdisciplinary Computing in Java Programming, The Springer International Series in Engineering and Computer Science; 2003; vol. 743.

Gupta; "Artificial Neural Network;" Network and Complex Systems; 2013; pp. 24-28; vol. 3, No. 1.

Park et al.; Electric Load Forecasting Using an Artificial Neural Network; IEEE Transactions on Power Engineering; 1991; pp. 442-449; vol. 6.

Sasaki et al.; "Feature Analysis of Roof Shapes Using Rough Sets Theory;" Kansei Engineering International; 2006; pp. 13-18; vol. 6, No. 3.

Just-Agosto et al.; "Neural network based nondestructive evaluation of sandwich composites;" Composites: Part B; 2008; pp. 217-225; vol. 39.

May 9, 2019 Search Report issued in International Patent Application No. PCT/EP2019/057831.

May 9, 2019 Written Opinion of the International Searching Authority issued in International Patent Application No. PCT/EP2019/057831.

* cited by examiner

CRACK EVALUATION OF ROOFING MEMBRANE BY ARTIFICIAL NEURAL NETWORKS

TECHNICAL FIELD

The invention relates to a method for evaluating the crack intensity on a polymeric sheet such as a roofing membrane by means of an optical device for recording digital images and an artificial neural network and a system for carrying out the method.

BACKGROUND OF THE INVENTION

Under long term outside exposure of polymeric materials, such as roofing membranes, surface cracks will appear and eventually lead to failure of the product.

When inspecting a roof, it is thus a standard procedure to evaluate the crack intensity on the surface of the membranes. Similarly, the result of artificial weathering is evaluated this way, as documented in DIN EN 13956, section 5.2.16. Up to now, the crack intensity is evaluated by a trained person according to a scale as defined in DIN EN 1297, Annex B, Table B.1. The scale ranges from 0 (no cracks) up to 3 (broad and deep cracks), where a value of 3 means that the product has to be considered damaged.

Since a trained person is required to reliably assign observed crack patterns to a crack intensity grade, this evaluation cannot be made on site. Instead, samples of the membrane are cut out and sent to a person specifically trained for the evaluation. This is a cumbersome procedure and requires roof repair after collecting the sample. Since the outcome decides on very costly roof repair refurbishment measures, it is not possible to entrust a non-trained person with this crack evaluation. In addition, this approach is prone to errors, since the distribution of cracks on a roof may be unevenly.

Since crack evaluation is the basis for a decision on a full roof restoration, the problems mentioned above may result in repairs that are not necessary, or may result in the prevention of repairs that are necessary, with subsequent damages by leaking water. In case that a trained person is not available, e.g. due to sickness or vacation, etc., no meaningful evaluation can be done at all. In this regard, it is to be noted that there are only a relative small number of trained persons who are able to carry out a reliable crack evaluation.

SUMMARY OF THE INVENTION

It was an object of the present invention to overcome these disadvantages of the prior art. In particular, it was an object of the present invention to provide a method for evaluating the crack intensity on a polymeric sheet, which is reliable, fast and non-destructive and does not require operation by a specifically trained person. In addition, the method should allow implementation on site where the polymeric sheet is installed.

Surprisingly it was found that the above object could be solved by an automated crack evaluation based on an apparatus for recording digital images in combination with a trained artificial neural network. Preferably, the method also includes the use of a suitable optical magnifying device, such as a microscope, to provide magnified images for inspection.

Accordingly, the present invention provides a method for evaluating the crack intensity on a polymeric sheet based on a predetermined scale of crack intensity grades, comprising the steps of a) recording a digital image of at least a portion of a surface of the polymeric sheet using an apparatus for recording digital images; and b) automatic classification of the crack intensity by a computer-implemented program for pattern recognition by means of a trained artificial neural network, comprising
1) inputting the digital image or one or more subareas of the digital image to the trained artificial neural network as input data,
2) classification by the artificial neural network by assigning a grade from the predetermined scale of crack intensity grades to the digital image or the one or more subareas and
3) outputting the assigned grade or grades for the digital image and/or the one or more subareas as output data, wherein the artificial neural network is trained in advance in a learning phase with a plurality of digital images or subareas thereof of polymeric sheet surface portions, whose grades in the predetermined scale are known and cover all grades of the predetermined scale and wherein the polymeric sheet is a roofing membrane or a sealing membrane.

Surprisingly, the crack condition of a polymeric sheet such as a roofing membrane can be reliably evaluated by a trained artificial neural network. Operation by a specifically trained person is not necessary for application of the method. Once the learning phase has successfully been finished, the system can be handed to any person that is able to take pictures of the affected surface, e.g. on a roof.

The method is reliable and non-destructive. With the performance of standard processors of today, results can be obtained within a few seconds. The inventive method does not require parametrized data from the digital image to be evaluated with respect to crack intensity.

The invention further relates to a system for evaluating the crack intensity on a polymeric sheet based on a predetermined scale of crack intensity grades, wherein the system comprises A) an apparatus for recording digital images; and B) a data processing device comprising means for carrying out step b) of the inventive method.

Preferred embodiments are described in the dependent claims.

DETAILED DESCRIPTION OF THE INVENTION

Figure 1:
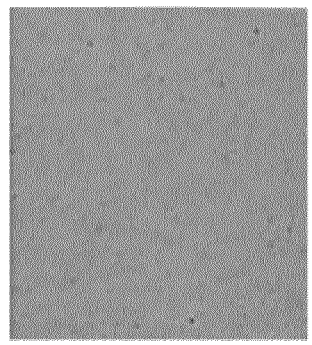
FIG. 1 depicts an image of the surface of a single ply roofing membrane with almost no cracks: grade 0 on the scale of crack intensity used in the example.

The following description related to the inventive method also applies to the inventive system, where applicable and vice versa.

The present invention provides a method for evaluating the crack intensity on a polymeric sheet based on a predetermined scale of crack intensity grades.

The polymeric sheet is a roofing membrane, in particular a single ply roofing membrane, or a sealing membrane, in particular a waterproofing membrane, wherein the polymeric sheet is preferably made of a thermoplastic or thermoset material.

A preferred polymeric sheet, in particular single ply roofing membrane, made of a thermoplastic material is a polyvinyl chloride (PVC) membrane, a thermoplastic olefin (TPO) membrane or a ketone ethylene ester (KEE) membrane. A preferred polymeric sheet, in particular single ply roofing membrane, made of a thermoset material is an ethylene propylene diene monomer (EPDM) membrane.

The thickness of the polymeric sheet may depend on the desired application and quality. For instance, the thickness for the polymeric sheet may be in the range of 0.75 mm to 2.5 mm, preferably 1.2 to 2.0 mm, in particular for a single ply roofing membrane.

The evaluation of the crack intensity on a polymeric sheet is based on a predetermined scale of crack intensity grades. The grades of the scale refer to a graded classification of crack intensities from absence of or low crack intensity to very high crack intensity. Any scale of crack intensity grades, which has been established in advance can be used. The predetermined scale is preferably a standardized scale. While the predetermined scale includes at least two grades, the scale preferably includes three, four, five or more grades.

In a preferred embodiment the scale defined in DIN EN 1297:2004-12, Annex B, Table B.1, with grades of 0 to 3 or a selection from these grades is used as the predetermined scale for the crack intensity grades. Polymeric sheets exhibiting a grade of 3 are considered damaged and usually a repair or replacement is necessary.

The scale given in standard DIN EN 1297:2004-12 actually refers to thin coatings, but is also suitable for polymeric sheets, which usually have a higher thickness, to which the present invention refer. The scale given in DIN EN 1297 is related to judgement of an experienced person and typically not quantified. For this scale, crack intensity and a rough estimation of dimensions of the cracks observed for polymeric sheets is as follows:

Grade 0: essentially no cracks
Grade 1: flat and faint cracks (typically cracks of less than 10 μm in width and depth are present)
Grade 2: moderate to pronounced cracks (typically cracks of more than 10 μm and less than 100 μm in width and depth are present)
Grade 3 broad and deep cracks (typically cracks of more than 100 μm in width and depth are present)

While the predetermined scale may preferably include all the grades as defined in DIN EN 1297:2004-12, Annex B, Table B.1, it is also possible, to use a selection from these grades as the predetermined scale for the crack intensity grades, for instance a scale including only grades 0, 2 and 3 or grades 1, 2 and 3 as defined in DIN EN 1297:2004-12. A limited selection of grades may be suitable, if e.g. only the selected grades are relevant for the inspected polymeric sheet. Other rating scales are technically possible as well.

The inventive method includes the step of a) recording a digital image of at least a portion of a surface of the polymeric sheet using an apparatus for recording digital images. The digital image may be of the entire surface of the polymeric sheet or preferably of a portion of the surface of the polymeric sheet. It should be self-evident that the digital image is generally a top view image of the polymeric sheet surface.

In a preferred embodiment, the polymeric sheet is an installed polymeric sheet and the digital image is recorded on the installation site. Since the program for pattern recognition may be implemented on a portable data processing device, the automatic classification of the crack intensity can be also carried out on the installation site. Alternatively, the automatic classification of the crack intensity may be effected at a different place where the data processing device is located.

According to the prior art, a portion of the polymeric sheet is cut out from the installation site and is delivered to another location for analysis. The removed portion must be replaced. A benefit of the present invention is that the method is non-destructive.

In a preferred embodiment, the digital image is a magnified image of the portion of the polymeric sheet surface. The magnification is preferably in the range of from 5 to 50, more preferably from 8 to 30 or 10 to 30, most preferably approximately 10. The most preferred embodiment is given by taking pictures of cracked surface with a magnification of 10-fold, in order to conform to DIN EN 13956 and DIN EN 1297. However, any other magnification is technically possible as well.

The area of the surface of the polymeric sheet or of the portion of the surface of the polymeric sheet, respectively, from which the digital image is taken can vary, but is preferably an area of at least 100 cm$^2$, e.g. an area of at least 10 cm×10 cm, of the surface of the polymeric sheet. A subarea of the digital image used for evaluation as discussed below, preferably represents an area of at least 100 mm$^2$, e.g. an area of at least 10 mm×10 mm, of the surface of the polymeric sheet. The term area refers to an actual area of the polymeric sheet, i.e. not magnified.

The digital image recorded may be used as input data for the following step of automatic classification. Alternatively, one or more subareas of the digital image recorded may be used as input data for the following step of automatic classification.

The use of a plurality of subareas instead of the entire digital image may provide statistically more reliable results, since cracks of varying broadness and deepness may be distributed unevenly on the digital picture. Moreover, digital images often include image regions of different image quality so that it is possible to select subareas of higher image quality which may improve the evaluation results. For instance, it is known that in general the focus frame and the image margins of a digital image represent regions of lower image quality compared to other regions of the digital image.

In a preferred embodiment a plurality of subareas of the digital image is generated by decomposing an image region located between the focus frame of the digital image and the image margins of the digital image into an array of subareas.

The plurality of subareas is preferably generated by tiling, i.e. an array of subareas in form of tiles spaced from each other is generated.

When a plurality of subareas of the digital image is used, the plurality of subareas are preferably at least 20, more preferably at least 75 subareas of the digital image, and preferably not more than 500, more preferably not more than 200 subareas.

The generation of subareas of a digital image in a desired pattern is conventional for a skilled person. Commercial programs for generating such subareas or array of subareas according to a desired pattern are available. If one or more subareas are used according to the method, the subareas are generated from the image data received from step a) and the subareas obtained are used as input data for the automatic classification step b).

The inventive method further includes the step of b) automatic classification of the crack intensity by a computer-implemented program for pattern recognition by means of a trained artificial neural network, comprising
1) inputting the digital image or one or more subareas of the digital image to the trained artificial neural network as input data,
2) classification by the artificial neural network by assigning a grade from the predetermined scale of crack intensity grades to the digital image or the one or more subareas and
3) outputting the assigned grade or grades for the digital image and/or the one or more subareas as output data.

An artificial neural network is a self-adaptive computer program that can be trained for certain tasks like pattern recognition. The program contains the option to build up and change connections between an input and an output. In the end, after a suitable training, the program can connect inputs (optical patterns) to output (rating).

Figure 9:
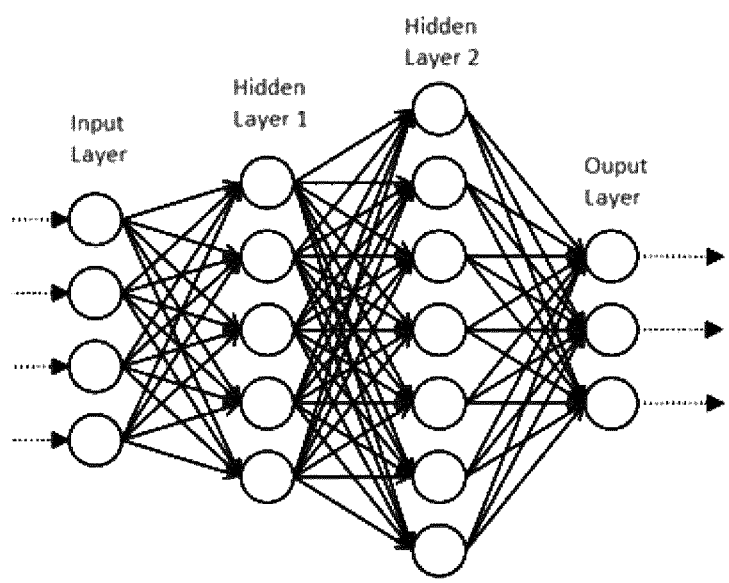
FIG. 9 is an exemplary representation scheme illustrating the principle of an artificial neural network.

An artificial neural network is based on a collection of connected units or nodes called artificial neurons. Each connection between artificial neurons can transmit a signal from one to another. The artificial neuron that receives the signal can process it and then signal artificial neurons connected to it. In common artificial neural network implementations, the signal at a connection between artificial neurons is a real number, and the output of each artificial neuron is calculated by a non-linear function of the sum of its inputs. Artificial neurons and connections typically have a weight that adjusts as learning proceeds. Thus, schematically an artificial neural network includes an input layer, an output layer and one or more hidden layers wherein a self-adaptive analysis is carried out. FIG. 9 illustrates the principle schematically.

The principles of artificial neural networks are known to the skilled person. Details of this technology and applications can be found e.g. in S. C. Wang, 2003, Artificial Neural Network, Interdisciplinary Computing in Java Programming, The Springer International Series in Engineering and Computer Science, Vol. 743, and N. Gupta, 2013, Artificial Neural Network, Network and Complex Systems, Vol. 3, No. 1, pp. 24-28.

Artificial neural networks are commercially available. An example is the program Watson developed by IBM.

Up to now, artificial neural networks are typically used for input that can be given in a mathematical form. For instance, an artificial neural network has been used for electric load forecasting, see D. C. Park et al., 1991, IEEE Transactions on Power Engineering, vol. 6, pages 442-449, or for the evaluation of design of roof shapes, given as a geometrical input, see K. Sasaki, K. Tsutsumi, Kansei Engineering International, 2006, vol. 6 no. 3 pages 13-18.

A specific feature of the present invention is that the artificial neural network is trained by direct comparison of digital images or subareas, which are not parametrized, in particular the input data for the artificial neural network are data which are not parametrized. As cracks have random and widely varying shapes, it was surprising that reliable results are achieved for crack evaluation.

The artificial neural network is trained in advance in a learning phase with a plurality of digital images or subareas thereof of polymeric sheet surface portions, whose grades in the predetermined scale are known and cover all grades of the predetermined scale.

As for all applications using an artificial neural network, a learning phase is required to train the artificial neural networks before the artificial neural network is suitable for practical application. In the application phase, the trained artificial neural network automatically accomplishes the classification of crack intensity based on the predetermined scale given and the input of digital data provided.

Learning paradigms used for artificial neural network are supervised learning, unsupervised learning or reinforcement learning, wherein supervised learning is preferred. The learning phase is preferably based on a direct feedback from a trained person.

In a preferred embodiment, the learning phase comprises
  a training phase where a plurality of digital images or subareas thereof are input to the artificial neural network and the artificial neural network is provided with the known grade of each of the digital images as feedback, and
  a test phase where the artificial neural networks classifies a plurality of digital images or subareas thereof and the grades assigned by the artificial neural networks are compared with the known grades of the digital images to determine a matching probability, and
  optionally repeating the training phase and the test phase until the matching probability desired is reached.

It is preferred to use at least 100 digital images for the learning phase, in particular each from a different polymeric sheet. A proportion of the digital images used, for instance a proportion of about 85 to 65%, is used for the training phase, and a proportion of the digital images used, for instance a proportion of about 15 to 35%, is used for the test phase, based on the total number of images used in the learning phase. An appropriate ratio for said proportions is e.g. about 75% images for the training phase and about 25% images for the test phase.

If the matching probability desired is not achieved after a first learning cycle, the training phase and the test phase may be repeated one or more times until the matching probability desired is reached. It is evident that for a second and any further learning cycles digital images and/or subareas of digital images are to be used which are different from those used in the previous learning cycles in order to avoid redundancy. For a further learning cycle, the number of digital images and/or subareas may be appropriately lower than or the same as the number of digital images and/or subareas used in the first learning cycle.

The matching probability achieved after the learning phase is preferably at least 70%, more preferably at least 80%.

Hence, the artificial neural network can be trained in a learning phase comprising the following steps:

1) Provide at least 100 representative samples of membrane with different crack intensity, covering all relevant crack grades, e.g. grades 0, 1, 2, 3 according to DIN EN 1297;
2) Use a microscope with 10-fold magnification to take pictures of these samples and feed the pictures into the artificial neural network;
3) Train the artificial neural network by feeding the assigned crack rating of the trained person for each picture into the artificial neural network;
4) Check for matching probability by evaluating a certain amount of samples by the trained person and the artificial neural network in parallel and comparing the outcome
5) Extend this procedure and training sample size, until a pre-defined matching probability (e.g >80% agreement between trained person and artificial neural network) is reached.

In particular, the apparatus for recording digital images is an optical device for recording digital images. Accordingly, digital images recorded by the optical device are digitalized optical images, i.e. digital representations of optical images. The term "optical" refers to applications in the range of visible light.

Preferably, the apparatus for recording digital images is portable. The apparatus for recording digital images is preferably a digital camera or an optical magnifying device including an image sensor, wherein an optical magnifying device including an image sensor is preferred. In principle, a smartphone or a tablet computer may be also used as the apparatus for recording digital images. The optical magnifying device is preferably a microscope including an image sensor. The apparatus for recording digital images usually includes a processing unit to transform the signals of the image sensor into electronic data of the digital image, and optionally a storage unit to store digital images recorded.

The apparatus for recording digital images is generally provided with means for transferring the recorded digital image or recorded magnified digital image to one or more processing units wherein the program for pattern recognition and optionally a program for generating subareas of the digital image is implemented. The means for transferring the data may be a common wire connection, e.g. an USB cable, or a wireless connection. Hence, the transfer of data between the apparatus for recording digital images and the data processing device may be effected by wire connection or wireless connection. It is also possible that the apparatus for recording digital images and the data processing device are located in the same device, e.g. a smartphone or a tablet computer.

The program for pattern recognition is computer-implemented, e.g. on a smartphone, a tablet computer, a laptop computer or a personal computer.

In a preferred embodiment, the apparatus for recording digital images is an optical magnifying device including an image sensor, preferably a microscope including an image sensor, and is provided with means for transferring the recorded digital image or magnified digital image to a smartphone, a tablet computer, a laptop computer or a personal computer.

If one or more subareas of the digital image are used for the inventive method, a program is used for generating the one or more subareas. The program for generating subareas of the digital image is computer-implemented, e.g. on a smartphone, a tablet computer, a laptop computer or a personal computer, which may be the same on which the program for pattern recognition is implemented or a different one.

It is preferred that the digital image is recorded with a standardized recording distance and standardised light conditions. In a particular preferred embodiment, the apparatus for recording digital images, preferably the optical magnifying device including an image sensor, in particular the microscope including an image sensor, is therefore configured to record the digital image with a standardized recording distance and standardised light conditions. This standardized recording distance and standardised light conditions may be predetermined in connection with the predetermined scale used.

Such predefined conditions are advantageous in order record pictures under comparable conditions so that the appearance of the cracks in the digital image is not affected by differing recording conditions. This allows for an improved crack evaluation.

Further, many roofing membranes are highly reflective, which may affect the image quality too. Therefore, in a preferred embodiment the apparatus for recording digital images is configured to shield the portion of the polymeric sheet to be recorded from external light sources such as sun light, and includes an internal light source to illuminate the portion of the polymeric sheet to be recorded with standardized light conditions.

An example for a suitable apparatus for recording digital images is W5 Wifi mini microscope obtainable from Ostec Electronics. W5 Wifi mini microscope is portable, can record magnified digital pictures, and transmit the data to any desired data processing device by wire connection or wireless connection. Moreover, W5 Wifi mini microscope is configured to ensure defined light conditions and a defined distance to the sheet. Said microscope includes means to shield external light sources and is provided with internal light sources.

If the embodiment of the invention is used, where a plurality of subareas of the digital image are input to the artificial neural network, the artificial neural network assigns a grade from the predetermined scale to each of the subareas by parallel or subsequent processing. The grade or overall grade of the digital image is preferably determined from the grades assigned to each subarea by assigning the grade to the digital image which corresponds to that grade to which the highest number of subareas are assigned. Typically, a large majority of subareas of a digital image are assigned to one certain grade.

The method may be repeated one or more times with one or more further digital images recorded from one or more portions of the surface of the polymeric sheet at different locations of the polymeric sheet. This may be suitable to verify the result achieved or to obtain more detailed information on the crack intensity of the polymeric sheet.

The invention also concerns a system for evaluating the crack intensity on a polymeric sheet based on a predetermined scale of crack intensity grades, wherein the system comprises A) an apparatus for recording digital images; and
B) a data processing device comprising means for carrying out step b) of the inventive method.

Details on the apparatus for recording digital images and on the data processing device have been given above with respect to the inventive method so that reference is made thereto.

In particular, the apparatus for recording digital images is an optical device for recording digital images.

In a preferred embodiment, the apparatus for recording digital images is a digital camera or an optical magnifying device including an image sensor, preferably a microscope including an image sensor, wherein the apparatus for recording digital images is provided with means for transferring the recorded digital image or magnified digital image to the data processing device.

In a preferred embodiment, the apparatus for recording digital images is configured to record the digital image with a standardized recording distance and standardised light conditions.

As discussed above, the data processing device is preferably a smartphone, a tablet computer, a laptop computer or a personal computer.

The drawings enclosed and the followings examples are given for further explanation of the invention, which is however not limited to the embodiments of the examples.

EXAMPLES

A proof of concept for the inventive method was carried out by evaluating the crack intensity on a number of single ply roofing membrane samples.

As the predetermined scale of crack intensity grades a selection from the grades as defined in DIN EN 1297:2004-12, Annex B, Table B.1, was used. The scale used includes grades of 0, 1 and 2 which corresponds to grades 0, 2 and 3, respectively, of the scale as defined in DIN EN 1297:2004-12, Annex B, Table B.1.

Figure 2:
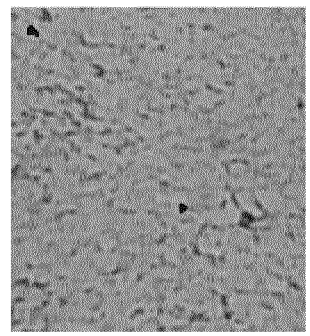
FIG. 2 depicts an image of the surface of a single ply roofing membrane with a number of moderate cracks: grade 1 on the predetermined scale of crack intensity grades used in the example.
Figure 3:
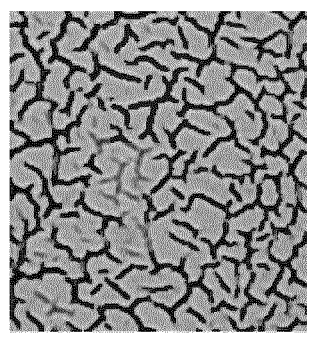
FIG. 3 depicts an image of the surface of a single ply roofing membrane with a high number of deep and broad cracks: grade 2 on the predetermined scale of crack intensity grades used in the example.

With respect to the scale for the crack intensity used, FIG. 1 represents an image of a single ply roofing membrane having a grade of 0, FIG. 2 represents an image of a single ply roofing membrane having a grade of 1, and FIG. 3 represents an image of a single ply roofing membrane having a grade of 2.

The digital images of single ply roofing membrane samples were recorded using a portable W5 Wifi mini microscope from Ostec Electronics. A conventional personal computer was used as data processing device on which a common program for pattern recognition by means of an artificial neural network and a conventional program for generating subareas of a digital image are implemented. The transfer of the data of a digital image recorded from the microscope to the personal computer is done via a wireless connection.

A total of 119 single ply roofing membrane samples were used in the test, all of which were graded by a trained person based on the used scale. Hence, the grade of all samples used is known.

A digital image was taken for each sample with the W5 Wifi mini microscope with a predetermined recording distance and predetermined light conditions and a 10-fold magnification. Each digital image recorded was transferred to the personal computer and subjected to a generation of an array of subareas by the program for generating subareas of a digital image by tiling.

Figure 4:
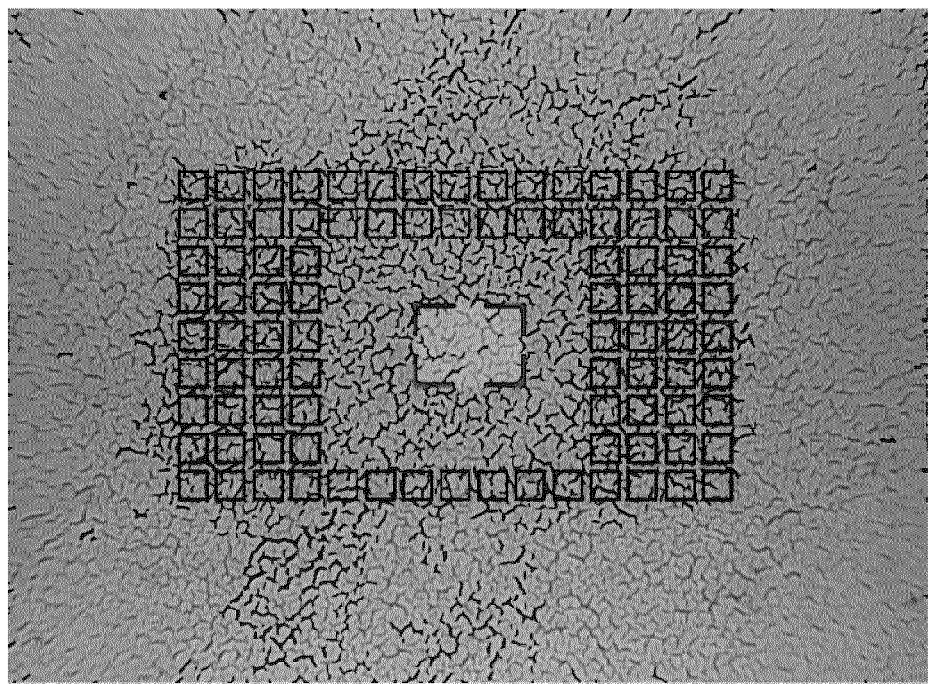
FIG. 4 depicts an image of the surface of a single ply roofing membrane. An image region located between the focus frame of the digital image and the less sharp image margins of the digital image is decomposed into an array of subareas in form of tiles.

The array of subareas is located in an image region between the focus frame at the centre of the digital image and the image margins of the digital image and is composed of 93 subareas in form of tiles per digital image. The pattern of the array of tiles is shown in FIG. 4. In FIG. 4 the region at the focus frame in the centre of the digital picture and the regions of the image margins exhibit lower image quality, whereas the region in which the subareas are located exhibits a good image quality.

Each digital image recorded represents an area of at least 100 $cm^2$ of the polymeric sheet. Each subarea represents an area of at least 100 $mm^2$ of the polymeric sheet.

The following table 1 summarises the number of digital images, which correspond to the number of single ply roofing membrane samples used, and the number of tiles (subareas) obtained therefrom together with the grades of each sample of the predetermined scale, which has been assigned by the trained person.

TABLE 1

| grade | Number digital images | Number tiles |
|---|---|---|
| 0 | 31 | 2883 |
| 1 | 48 | 4464 |
| 2 | 39 | 3627 |
| Total | 119 | 11067 |

The general procedure for processing is as follows. Each tile of a digital image is input to the artificial neural network as input data where each tile is processed subsequently. For the classification, the artificial neural network assigns a grade of 0, 1, or 2 to each tile as output data.

The grade of the digital image and thus of the polymeric sheet is then determined from the grades assigned to each tiles as that grade to which the highest number of subareas are assigned.

Since the artificial neural network used is not a trained artificial neural network, the tests carried out actually represent the learning phase for the artificial neural network.

Accordingly, the set of data as given in Table 1 above is divided into data for a training phase and data for a test phase. The first 10 digital images of each grade were used for the test phase, i.e. a total of 30 images (about 25% of the total images). The other digital images were used in the training phase of the artificial neural network (89 images, about 75% of total images).

The learning phase starts with the training phase, in which the subareas of the digital images provided for the training phase are input to the artificial neural network. During the training phase, the artificial neural network is also provided with the known grade of each digital image as feedback. As indicated above, the grade is known because it has been assigned by the trained person.

After the training phase, a test phase was conducted, in which the subareas of the digital images provided for the test phase are input to the artificial neural network. For each digital image, the grade assigned by the expert and the grade assigned by the artificial neural network were compared, and presence or absence of matching is noted.

The matching for each grade in the test phase is shown in Table 2.

TABLE 2

| Assigned grade | 0* | 1* | 2* |
|---|---|---|---|
| $0^1$ | 100% | 0% | 0% |
| $1^1$ | 0% | 100% | 0% |
| $2^1$ | 0% | 10% | 90% |

[1]assigned by artificial neural network;
*assigned by trained person

The resulting matching probability was 96.7%, which is a very good matching probability so that the learning phase can be finished. A repetition of the learning phase is not required. The artificial neural network is trained in a sufficient manner.

FIGS. 5 to 8 are example of digital images of polymeric sheet samples and grade assignments of subareas by the artificial neural network obtained during the test phase. The omission of the upper left corner in these images is an artefact. Said corners have been omitted because they include information written on the digital images.

Figure 5:
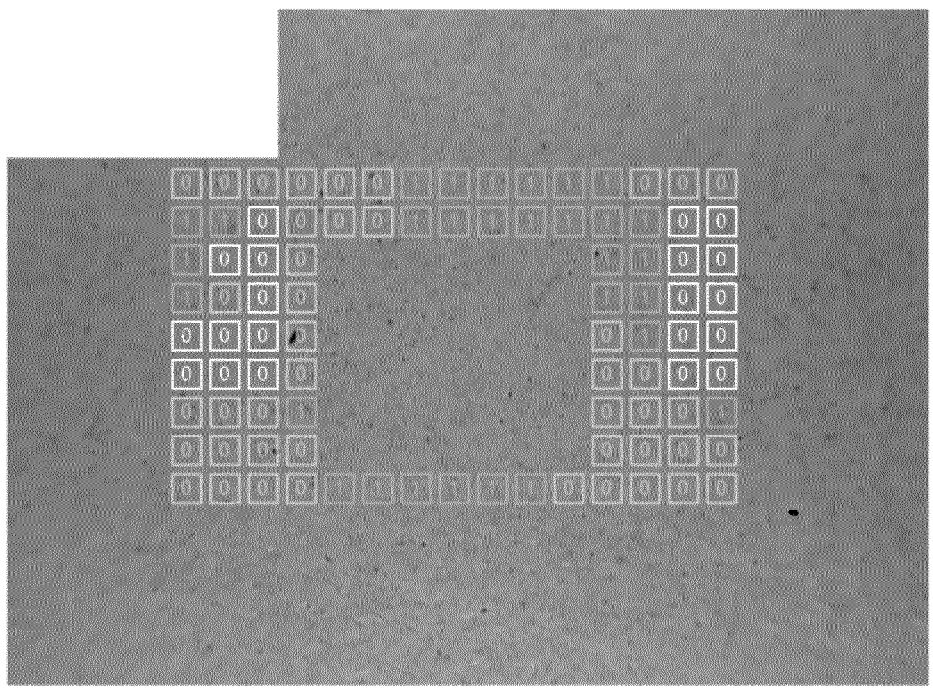
FIG. 5 depicts an image of the surface of a single ply roofing membrane with an assigned grade for the digital picture of 0 in the predetermined scale.

FIG. 5 is a digital image of a polymeric sheet which has been assigned a grade of 0 by the trained person. The artificial neural network assigned about 68% of the tiles with a grade of 0, and about 32% of the tiles with a grade of 1. Accordingly, the artificial neural network assigned the overall digital image with a grade of 0 (i.e. that grade to which the highest number of subareas are assigned by the artificial neural network) which matches with the grade determined by the trained person.

Figure 6:
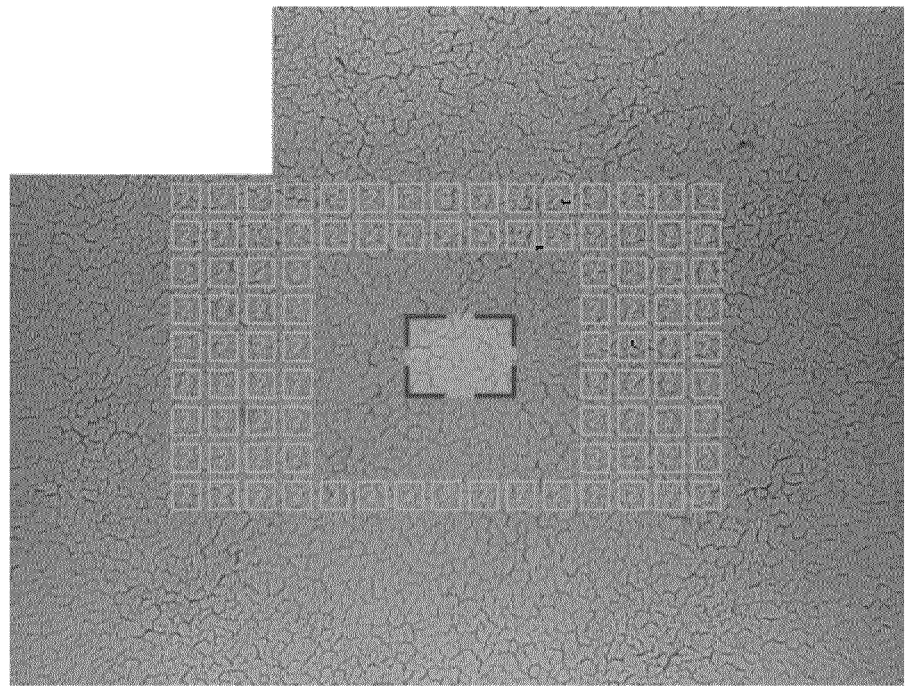
FIG. 6 depicts an image of the surface of a single ply roofing membrane with an assigned grade for the digital picture of 2 in the predetermined scale.

FIG. 6 is a digital image of a polymeric sheet which has been assigned a grade of 2 by the trained person. The artificial neural network assigned all tiles with a grade of 2. Accordingly, the artificial neural network assigned the digital image with a grade of 2 which matches with the grade determined by the trained person.

Figure 7:
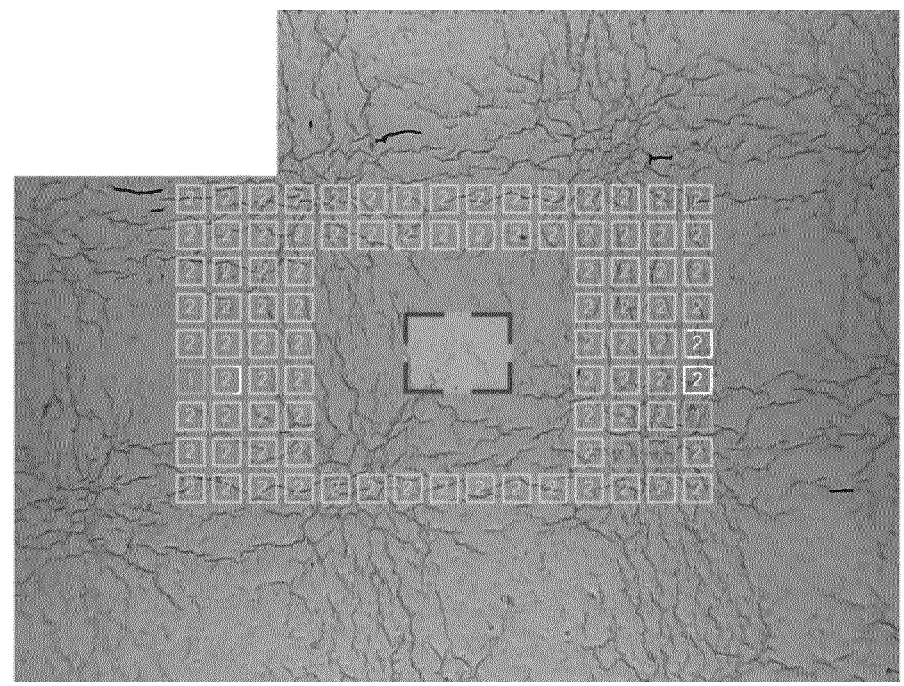
FIG. 7 depicts an image of the surface of a single ply roofing membrane with an assigned grade for the digital picture of 2 in the predetermined scale.

FIG. 7 is a digital image of a polymeric sheet which has been assigned a grade of 2 by the trained person. The artificial neural network assigned about 96% of the tiles with a grade of 2, and about 4% of the tiles with a grade of 1. Accordingly, the artificial neural network assigned the digital image with a grade of 2 which matches with the grade determined by the trained person.

Figure 8:
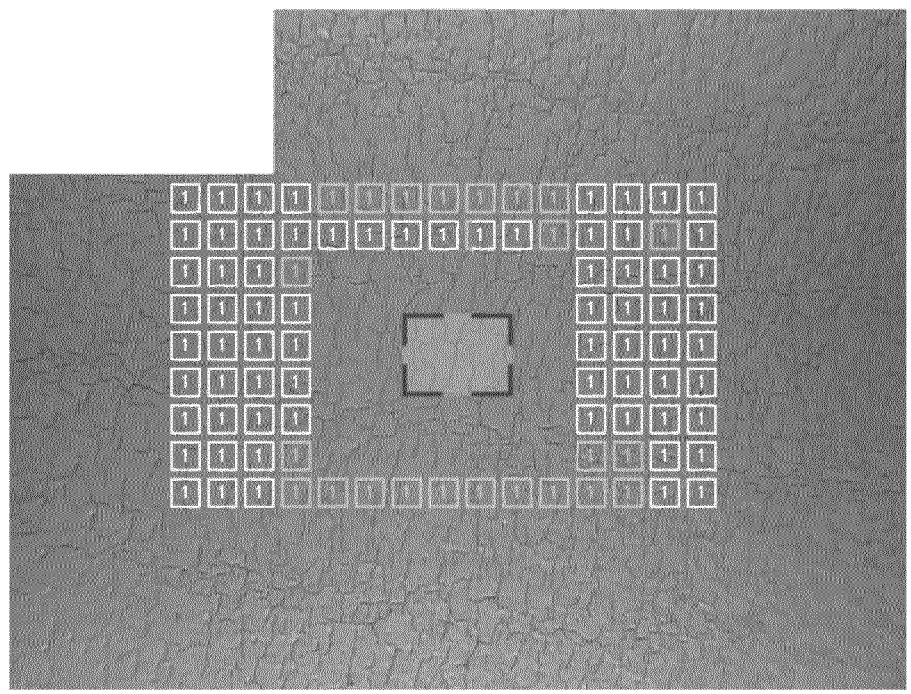
FIG. 8 depicts an image of the surface of a single ply roofing membrane with an assigned grade for the digital picture of 1 in the predetermined scale.

FIG. 8 is a digital image of a polymeric sheet which has been assigned a grade of 1 by the trained person. The artificial neural network assigned all tiles with a grade of 1. Accordingly, the artificial neural network assigned the digital image with a grade of 1 which matches with the grade determined by the trained person.

The invention claimed is:

1. A method for evaluating the crack intensity on a polymeric sheet based on a predetermined scale of crack intensity grades, comprising the steps of
    a) recording a digital image of at least a portion of a surface of the polymeric sheet using an apparatus for recording digital images; and
    b) automatic classification of the crack intensity by a computer-implemented program for pattern recognition by means of a trained artificial neural network, comprising
        1) inputting the digital image or one or more subareas of the digital image to the trained artificial neural network as input data,
        2) classification by the artificial neural network by assigning a grade from the predetermined scale of crack intensity grades to the digital image or the one or more subareas and
        3) outputting the assigned grade or grades for the digital image and/or the one or more subareas as output data,
    wherein the artificial neural network is trained in advance in a learning phase with a plurality of digital images or subareas thereof of polymeric sheet surface portions, whose grades in the predetermined scale are known and cover all grades of the predetermined scale and wherein the polymeric sheet is a roofing membrane or a sealing membrane,
    wherein the learning phase comprises:
        a training phase where a plurality of digital images or subareas thereof are input to the artificial neural network and the artificial neural network is provided with the known grade of each of these digital images as feedback, and
        a test phase where the artificial neural networks classifies a plurality of digital images or subareas thereof and the grades assigned by the artificial neural networks are compared with the known grades to determine a matching probability, and
        optionally repeating the training phase and the test phase until the matching probability desired is reached.

2. The method according to claim 1, wherein the apparatus for recording digital images is an optical device for recording digital images.

3. The method according to claim 1, wherein the polymeric sheet is a single ply roofing membrane.

4. The method according to claim 1, wherein the polymeric sheet is an installed polymeric sheet and the digital image is recorded on the installation site.

5. The method according to claim 1, wherein the digital image is a magnified image of the portion of the polymeric sheet surface, wherein the magnification is ranging from 5 to 50.

6. The method according to claim 1, wherein the scale defined in DIN EN 1297:2004-12, Annex B, Table B.1, with grades of 0 to 3 or a selection from these grades is used as the predetermined scale for the crack intensity grades.

7. The method according to claim 1, wherein at least 100 digital images are used as the plurality of digital images in the learning phase.

8. The method according to claim 1, wherein
    the apparatus for recording digital images is a digital camera or an optical magnifying device including an image sensor, wherein the apparatus for recording digital images is provided with means for transferring the recorded digital image or magnified digital image to one or more processing units wherein the program for pattern recognition and optionally a program for generating subareas of the digital image is implemented, and/or
    the program for pattern recognition is implemented on a smartphone, a tablet computer, a laptop computer or a personal computer.

9. The method according to claim 1, wherein the apparatus for recording digital images is an optical magnifying device including an image sensor, and is provided with means for transferring the recorded digital image or magnified digital image to a smartphone, a tablet computer, a laptop computer or a personal computer.

10. The method according to claim 1, wherein a plurality of subareas of the digital image are input to the artificial neural network in which a grade is assigned to each of the subareas by parallel or subsequent processing and the grade of the digital image is determined from the grades assigned to the subareas as that grade to which the highest number of subareas are assigned.

11. The method according to claim 1, wherein the plurality of subareas of the digital image is generated by decomposing an image region located between the focus frame of the digital image and the image margins of the digital image into an array of subareas, wherein the plurality of subareas are at least 20 subareas of the digital image.

12. The method according to claim 1, wherein the method is repeated one or more times with one or more further digital images recorded from one or more portions of the surface of the polymeric sheet at different locations of the polymeric sheet.

13. A system for evaluating the crack intensity on a polymeric sheet based on a predetermined scale of crack intensity grades, comprising
   A) an apparatus for recording digital images; and
   B) a data processing device comprising means for carrying out step b) of the method of claim 1.

14. The system of claim 13, wherein the apparatus for recording digital images is an optical device for recording digital images.

15. The system of claim 13, wherein the apparatus for recording digital images is a digital camera or an optical magnifying device including an image sensor, wherein the apparatus for recording digital images is provided with means for transferring the recorded digital image or magnified digital image to the data processing device, and/or
   wherein the data processing device is a smartphone, a tablet computer, a laptop computer or a personal computer.

16. The system of claim 13, wherein the apparatus for recording digital images is configured to record the digital image with a standardized recording distance and standardised light conditions.

* * * * *